(12) United States Patent
Hsu et al.

(10) Patent No.: US 11,679,547 B2
(45) Date of Patent: Jun. 20, 2023

(54) HIGH PRODUCTIVITY SYSTEM FOR PRINTING PRECISION ARTICLES

(71) Applicant: 3D Systems, Inc., Rock Hill, SC (US)

(72) Inventors: Kevin Michael Hsu, Arcadia, CA (US); Patrick Dunne, Lafayette, CA (US)

(73) Assignee: 3D SYSTEMS, INC., Rockhill, SC (US)

( * ) Notice: Subject to any disclaimer, the term of this patent is extended or adjusted under 35 U.S.C. 154(b) by 719 days.

(21) Appl. No.: 16/742,168

(22) Filed: Jan. 14, 2020

(65) Prior Publication Data

US 2020/0307071 A1 Oct. 1, 2020

Related U.S. Application Data

(60) Provisional application No. 62/824,724, filed on Mar. 27, 2019.

(51) Int. Cl.
*B29C 64/129* (2017.01)
*B33Y 30/00* (2015.01)
(Continued)

(52) U.S. Cl.
CPC .............. *B29C 64/129* (2017.08); *A61C 7/08* (2013.01); *A61C 19/003* (2013.01);
(Continued)

(58) Field of Classification Search
CPC ....... B29C 64/129; B29C 64/393; A61C 7/08; A61C 19/003; A61C 13/0013;
(Continued)

(56) References Cited

U.S. PATENT DOCUMENTS 8,019,465 B2 9/2011 Spiridonov et al.
8,572,849 B1 * 11/2013 Clark .................... F16M 11/14
403/53
(Continued)

FOREIGN PATENT DOCUMENTS

CN 110014537 A 7/2019
CN 112590213 A 4/2021
(Continued)

OTHER PUBLICATIONS

PCT International Search Report for International Search Authority for PCT/US20/13462, dated Oct. 25, 2019 5 pages).
(Continued)

*Primary Examiner* — Leith S Shafi (57) ABSTRACT

A three-dimensional printing system includes a resin vessel, a support tray, a motorized carriage, a light engine, and a controller. The resin vessel has a lower side with a transparent sheet which provides a lower bound for photocurable resin contained within the vessel. The support tray has a lower face for supporting an object being fabricated. The motorized carriage is for supporting and vertically positioning the support tray. The light engine is for projecting radiation up through the transparent sheet to a build plane. The controller operates the motorized carriage and the light engine to fabricate the object. The object includes a vertical arrangement of dental arches suspended from the lower face and a plurality couplings that connect pairs of the dental arches.

18 Claims, 9 Drawing Sheets

(51) Int. Cl.
  *B33Y 10/00* (2015.01)
  *B33Y 50/02* (2015.01)
  *B33Y 80/00* (2015.01)
  *B29C 64/393* (2017.01)
  *A61C 7/08* (2006.01)
  *A61C 13/15* (2006.01)
  *B29L 31/00* (2006.01)

(52) U.S. Cl.
  CPC ............ *B29C 64/393* (2017.08); *B33Y 10/00* (2014.12); *B33Y 30/00* (2014.12); *B33Y 50/02* (2014.12); *B33Y 80/00* (2014.12); *B29L 2031/753* (2013.01)

(58) Field of Classification Search
  CPC . A61C 13/0018; A61C 13/0019; B33Y 10/00; B33Y 30/00; B33Y 50/02; B33Y 80/00; B33Y 40/00; B29L 2031/753
  See application file for complete search history.

(56) References Cited

U.S. PATENT DOCUMENTS

| | | | |
|---|---|---|---|
| 9,539,072 | B2 | 1/2017 | El-Siblani |
| 2009/0037011 | A1 | 2/2009 | Spiridonov et al. |
| 2013/0056910 | A1* | 3/2013 | Houbertz-Krauss ........................ B29C 64/386 264/401 |
| 2016/0059487 | A1* | 3/2016 | DeSimone ............ B29C 64/124 425/162 |
| 2017/0165916 | A1* | 6/2017 | El-Siblani ............. B29C 64/124 |
| 2017/0173892 | A1* | 6/2017 | Steele ................. B29C 35/0805 |
| 2017/0274601 | A1 | 9/2017 | Dunne et al. |
| 2017/0326752 | A1* | 11/2017 | Osawa .................... G06T 19/20 |
| 2017/0334140 | A1* | 11/2017 | Andersson ............. B33Y 10/00 |
| 2018/0169940 | A1* | 6/2018 | Dunne ................... B33Y 30/00 |
| 2018/0236710 | A1 | 8/2018 | Turner |
| 2019/0336254 | A1* | 11/2019 | Hasan .................. A61C 9/0053 |
| 2021/0238335 | A1* | 8/2021 | Wu .................... C08G 18/7671 |

FOREIGN PATENT DOCUMENTS

| | | |
|---|---|---|
| JP | 2018514427 A | 6/2018 |
| WO | WO 2011/106472 | 9/2011 |
| WO | WO 2018/154252 | 8/2018 |

OTHER PUBLICATIONS

PCT International Written Opinion for International Search Authority for PCT/US20/13462 dated Oct. 25, 2019 (6 pages).
English Translation of Japanese First Office Action for Japanese Application No. 2021-555234 dated Sep. 28, 2022 (4 pages).

* cited by examiner

HIGH PRODUCTIVITY SYSTEM FOR PRINTING PRECISION ARTICLES

CROSS-REFERENCE TO RELATED APPLICATIONS

This non-provisional patent application claims priority to U.S. Provisional Application Ser. No. 62/824,724, Entitled "High Productivity System for Printing Precision Articles" by Kevin Michael Hsu et al., filed on Mar. 27, 2019, incorporated herein by reference under the benefit of U.S.C. 119(e).

FIELD OF THE INVENTION

The present disclosure concerns an apparatus and method for fabrication of solid three dimensional (3D) articles of manufacture from radiation curable (photocurable) resins. More particularly, the present disclosure improves productivity and precision of a stereolithography system.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support surface, and a controllable light engine. The stereolithography system forms a three dimensional (3D) article of manufacture by selectively curing layers of the photocurable resin. Each selectively cured layer is formed at a "build plane" within the resin. One challenge with these systems is to improve productivity. Another challenge is to maintain dimensional accuracy with increased high productivity.

SUMMARY

In a first aspect of the disclosure, a three-dimensional printing system includes a resin vessel, a support tray, a motorized carriage, a light engine, and a controller. The resin vessel has a lower side with a transparent sheet which provides a lower bound for photocurable resin contained within the vessel. The support tray has a lower face for supporting an object being fabricated. The motorized carriage is for supporting and vertically positioning the support tray. The light engine is for projecting radiation up through the transparent sheet to a build plane. The controller is configured to operate the motorized carriage and the light engine to fabricate the object. The object includes a vertical arrangement of dental arches suspended from the lower face and a plurality of couplings that connect pairs of the dental arches.

The object design has some advantages. Having a vertical arrangement of dental arches maximizes efficiency of a system for which the arches extend downwardly from the lower face of the support tray, overlapping with the arch below. Having the plurality of couplings for support rather than a more conventional external scaffold reduces an amount of material required for support and scarring of the object during support removal.

In one implementation the object includes a plurality of the vertical arrangements of dental arches. The vertical arrangement can include at least three, at least four, or at least five dental arches. The object can include two, three, four, five, or more than five vertical arrangements. This plural arrangement further improves the productivity of a system utilizing a support tray with a downward facing support surface.

The ability to print one or plural vertical arrangements of dental arches improves productivity of the three-dimensional printing system. In particular, long unattended operation can allow for "overnight" printing time during which the three-dimensional printing system may otherwise be idle. Another advantage is that the time required to change out the support tray is amortized over the production of more dental arches. The frequency of having to switch and change out the support tray is greatly reduced which has the combined effect of (1) improving machine utilization and (2) reducing labor cost per dental arch.

In another implementation the vertical arrangement includes a top arch that is directly connected to the lower face of the support tray and a plurality of additional arches that hang down from the top arch. The couplings provide the primary support for the additional arches. Primary support by the couplings means that most of the cross sectional area of connecting support material at the arch is provided by the couplings as opposed to an external scaffold.

The couplings of the disclosure provides for minimal material usage, high dimensional accuracy, and reduced scarring compared to alternative approaches. An alternative approach would be to support the dental arches with a scaffold that has endpoints connecting at the support tray and outer surfaces of the dental arches. Such an approach would require more material usage, would reduce the amount of arches that can be printed at any one time and would leave scars on an outer surface of the dental arches.

In yet another implementation the dental arches individually include an apex and two wings. The apex is convex downwardly and the wings extend generally upwardly and outwardly. The couplings individually connect a top end of a wing to an outer surface of an arch above the wing. Two couplings support an arch from either top end.

In a further implementation the couplings individually define a slot that provides a break feature for separating the coupling from the dental arch. The slot can include two slots including an upper slot and a lower slot. The upper slot can define a shape of an oval that is oriented obliquely with respect to a vertical and lateral axis and is for separating the couplings from a concave lower surface of an arch. The lower slot can define the shape of a lateral circle for separating the couplings from an upper end of a wing. The slots improve ease of separating the couplings from the dental arches without damage to the arches.

In a yet further implementation a dental arch includes an upwardly extending wing with a molar. A branch support connects one of the couplings to an upper and outer surface of the molar and/or other portions of a dental arch below the branch support. The branch support can include a relatively larger cross-section or diameter portion that connects to the couplings to provide structural strength. The branch support can include a plurality of fine or relatively smaller cross-section or diameter ends that directly connect to the surface of the dental arch. The branch support facilitates formation of the outwardly extending features such as teeth.

In another implementation, the couplings individually define a curved nonlinear shape in a vertical plane. The couplings also have a triangular cross-section. The couplings individually have upper and lower slots that are angled perpendicular to the arch surface it contacts for separating the coupling from a pair of dental arches. The triangular cross section facilitates ease of breaking the couplings from the arches. The upper slot can define an oblique angle with respect to a vertical axis. The lower slot can be generally parallel to a lateral plane.

In yet another implementation, the couplings can include two main larger couplings and two smaller couplings. The two larger couplings individually couple an upper end of a wing of a dental arch to a dental arch above. The two larger couplings can have a triangular cross section and slots for separation. The two smaller couplings are individually generally located below the larger couplings and can have a cylindrical cross section. The two smaller couplings in combination with the larger couplings improve rigidity of the coupling between dental arches by providing 4 points of contact, reducing twisting, wobbling and bending motions during printing.

In a further implementation, the dental arches can individually include an external scaffold between wings of the arch. The external scaffold can define an equilateral triangular geometry to maximize a resistance to shear deformation. The scaffold also prevents the molars of the arch from bowing in or out during the curing process and when it is decoupled from the stack. A branch support can couple the external scaffold to teeth near an apex of the arch.

In a second aspect of the disclosure, a method of operating a three-dimensional printing system includes: (1) positioning a lower face of a resin tray (or three-dimensional object) at a build plane within the resin vessel, (2) operating a light engine to selectively project radiation up through the resin vessel to the build plane, and (3) repeat positioning the resin tray and operating the light engine to define an object onto the lower face of the resin tray. The object includes a vertical arrangement of dental arches suspended from the lower face and a plurality of couplings that connect pairs of the dental arches.

In a third aspect of the disclosure, a non-transitory computer-readable storage medium for operating a three-dimensional printing system has computer-readable code portions stored therein. In response to execution by a processor the computer-readable code portions cause the three-dimensional printing system to at least: (1) position a lower face of a resin tray at a build plane within a resin vessel, (2) operate a light engine to selectively project radiation up through the resin vessel to the build plane, and (3) repeat positioning the resin tray and operating the light engine to define an object onto the lower face of the resin tray. The object includes a vertical arrangement of dental arches suspended from the lower face, and a plurality of couplings that connect pairs of the dental arches.

DETAILED DESCRIPTION OF THE PREFERRED EMBODIMENTS

Figure 1:
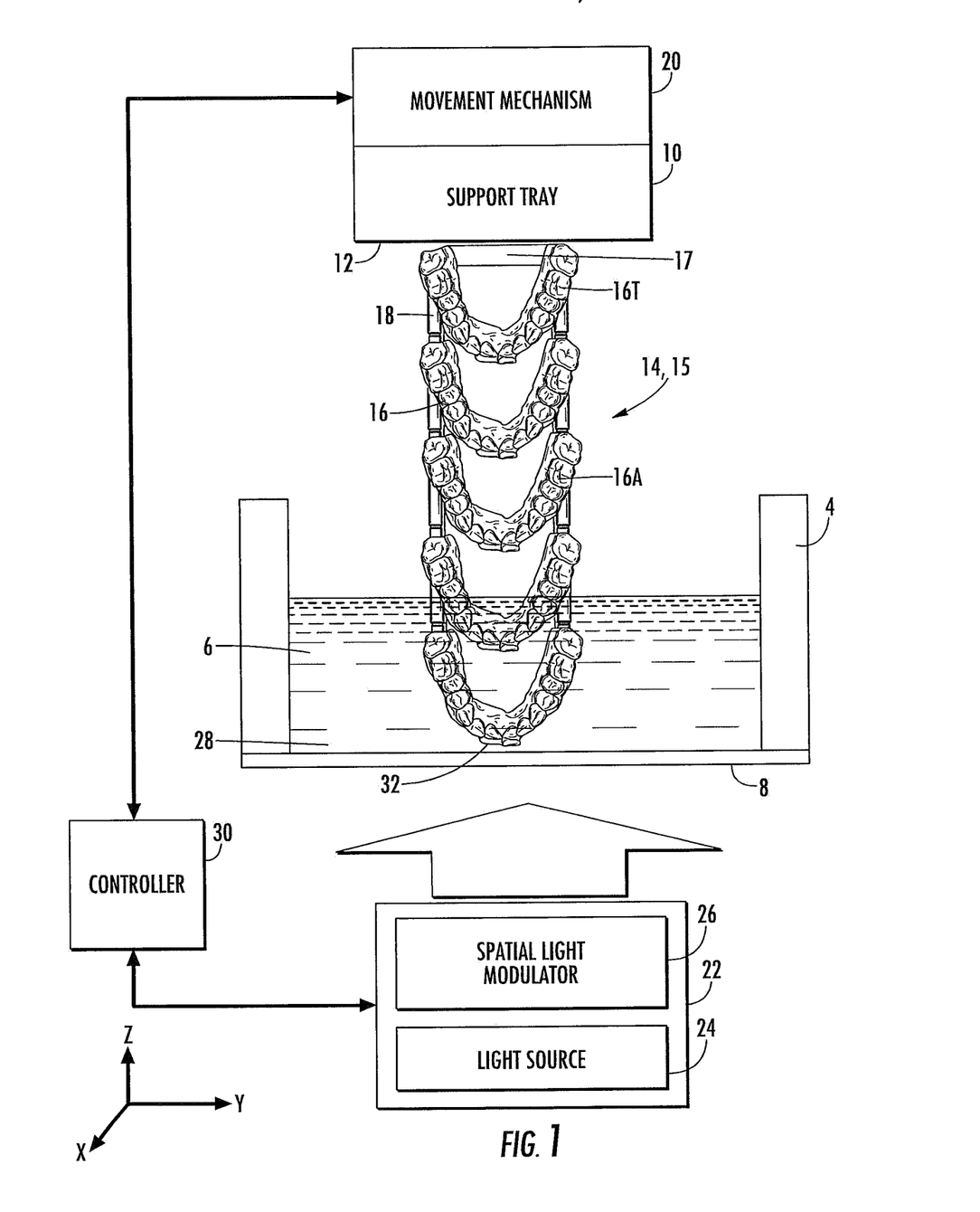
FIG. 1 is a schematic front view of an embodiment of a three-dimensional printing system.

FIG. 1 is a schematic front view of an embodiment of a three-dimensional printing system 2. In describing system 2, mutually orthogonal axes X, Y, and Z can be used. Axes X and Y are lateral axes that are generally horizontal. Axis Z is a vertical axis that is generally aligned with a gravitational reference. "Generally" aligned means aligned by design but not exactly. Generally aligned means aligned to within normal manufacturing tolerances.

Figure 2:
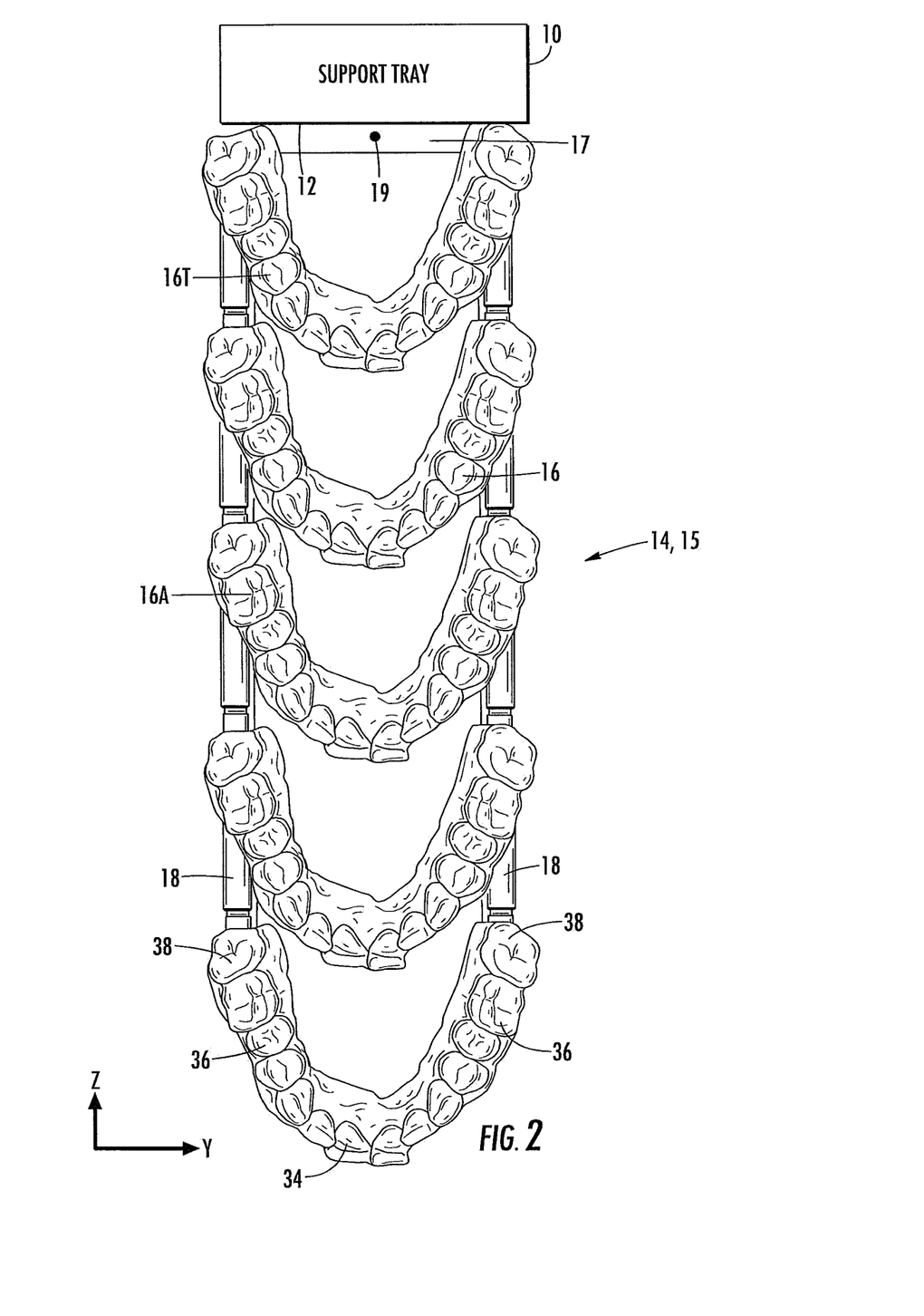
FIG. 2 is a more detailed schematic front view taken from FIG. 1.

System 2 includes a resin vessel 4 containing resin 6 which has a lower bound defined by a transparent sheet 8. A support tray 10 has a lower face 12 for supporting an object 14. Object 14 includes plurality of dental arches 16 that are vertically arranged along the vertical axis Z. The illustrated plurality of dental arches is a single vertical arrangement 15. The illustrated embodiment includes a top dental arch 16T that is directly connected to the lower face 12 of the support tray 10. The top dental arch 16T includes a support bar 17. Support bar 17 is directly connected to the lower face 12. As shown in FIG. 2, the support bar 17 defines an opening 19. Opening 19 can be a 2 millimeter diameter hole that passes laterally through the support bar 17 along axis X. Opening 19 can be used to suspend object 17 when it is to be dipped into cleaning baths subsequent to a fabrication process.

Additional dental arches 16A are below the top dental arch 16T and connected in a pairwise manner by couplings 18. The primary support for the additional dental arches 16A are from the pairwise coupling provided by the couplings 18. The term "primary support" for the additional dental arches 16A implies that more than 50% of the vertical support yield strength or cross-sectional area supporting the additional dental arches 16A is provided by a direct connection between the top dental arch 16T and the next additional dental arch 16A just below 16T. In more particular embodiments, more than 70%, more than 80%, or more than 90% of the vertical support yield strength or cross-sectional area supporting the additional dental arches 16A is provided by a direct connection between the top dental arch 16T and the next additional dental arch 16A just below 16T.

The system 2 includes a movement mechanism 20 connected to the support tray 10. The movement mechanism 20 is configured to vertically position the support tray 10 and hence a lower end or face 32 of object 14 with respect to a build plane 28.

The system 2 includes a light engine 22 which further includes a light source 24 and a spatial light modulator 26. The light engine 22 projects pixelated light up through the transparent sheet 8 to define the build plane 28 within the resin 6 and above the transparent sheet 8. Other light engines 22 can also be used such as a laser and/or a mechanically scanning imaging bar.

A controller 30 is electrically or wirelessly coupled to the movement mechanism 20 and the light engine 22. The controller 30 is configured to operate the movement mechanism 20, the light engine 22, and other components of the system 2 to fabricate the object 14. The controller includes a processor coupled to an information storage device. The information storage device includes a non-transitory computer readable storage medium that stores computer-readable program code portions. In response to execution by the processor, the computer-readable program code portions operate portions of system 2 to at least perform the following steps: (1) position the lower face 12 of the support tray (or a lower face 32 of the object 14) at the build plane 28; (2) operate the light engine 22 to project radiation up to the build plane to selectively harden a layer of the object 14; (3) Repeat steps (1) and (2) to complete fabrication of the object in a layer-by-layer manner.

The controller 20 can include a computer that is co-located with the other components of system 2 or it can include remote computers. The controller can include one or more of a local controller, a host computer, a mobile computer, a smart phone, a remote server, and other computer components. When the controller 20 includes multiple computer components, the storage medium and processor can individually include multiple storage and processor components at various locations. The stored software can be either local to one computer component or distributed among multiple computer components.

FIG. 2 is a more detailed schematic front view of the support tray 10 supporting object 14. The object 14 includes the vertical arrangement of dental arches 16 connected to and suspended from the lower face 12 of the support tray 10.

In the illustrated embodiment a single dental arch 16 has an apex 34 and two wings 36. The apex 34 defines a lower end of the dental arch 16 and is oriented concave upwardly and convex downwardly. The two wings 36 extend generally upwardly and laterally outwardly from the apex 34. The wings 36 define upper ends 38.

Couplings 18 individually connect an upper end 38 of one dental arch 16 to an outer side of a wing 36 above. Each pair of dental arches 16 is connected together by two couplings 18. In the illustrated embodiment, the couplings 18 have a generally cylindrical outside geometry. An axis of the generally cylindrical geometry of the illustrated couplings is generally aligned with the vertical axis Z.

Figure 3:
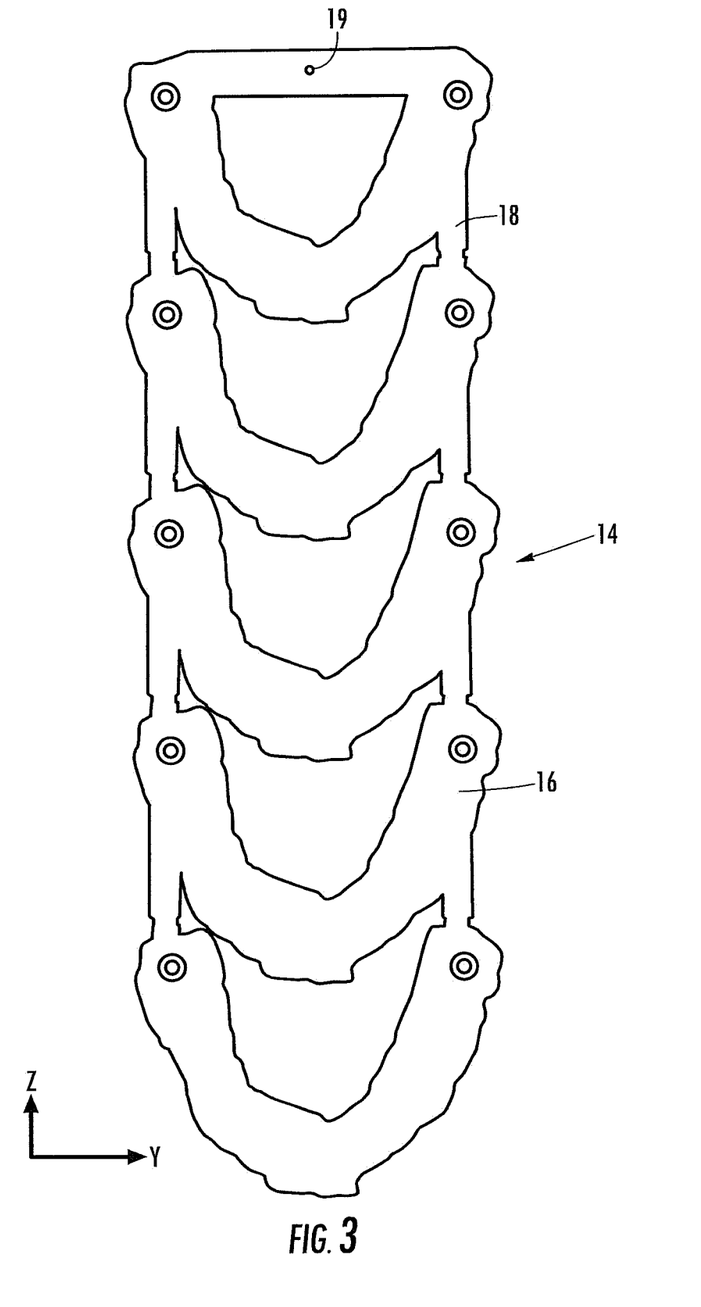
FIG. 3 is a YZ-plane cross-section taken through the object 14 of FIG. 2.

FIG. 3 is an YZ-plane cross-section through the object 14 of FIG. 2. As can be seen, in the illustrated embodiment the dental arches 16 and the couplings 18 are hollow to reduce resin usage and weight bearing down from the support tray 10. A wall thickness can be defined separating a hollow interior from a region outside the dental arches. In various embodiments, the wall thickness can be in a range of about 1 to 3 millimeters or about 1.5 to 2.5 millimeters or about 1.5 millimeter or about 2 millimeters. Printing the dental arches with a 2 millimeter wall thickness reduces resin usage by 35% compared to a solid arch. Printing the dental arches with a 1.5 millimeter wall thickness reduces the resin usage by 50% compared to a solid arch. Because the couplings 18 are hollow they only add about five percent to resin usage. This is far lower than a requirement would be with external support scaffolds. External support scaffolds can require up to 80-100% more material than the arches themselves. External support scaffolds also have endpoints on the support tray 10 and an outer surface of the object 14. Removing scaffolds from an outer surface can cause scarring (leave defects such as scars on the outer surface).

Figure 4:
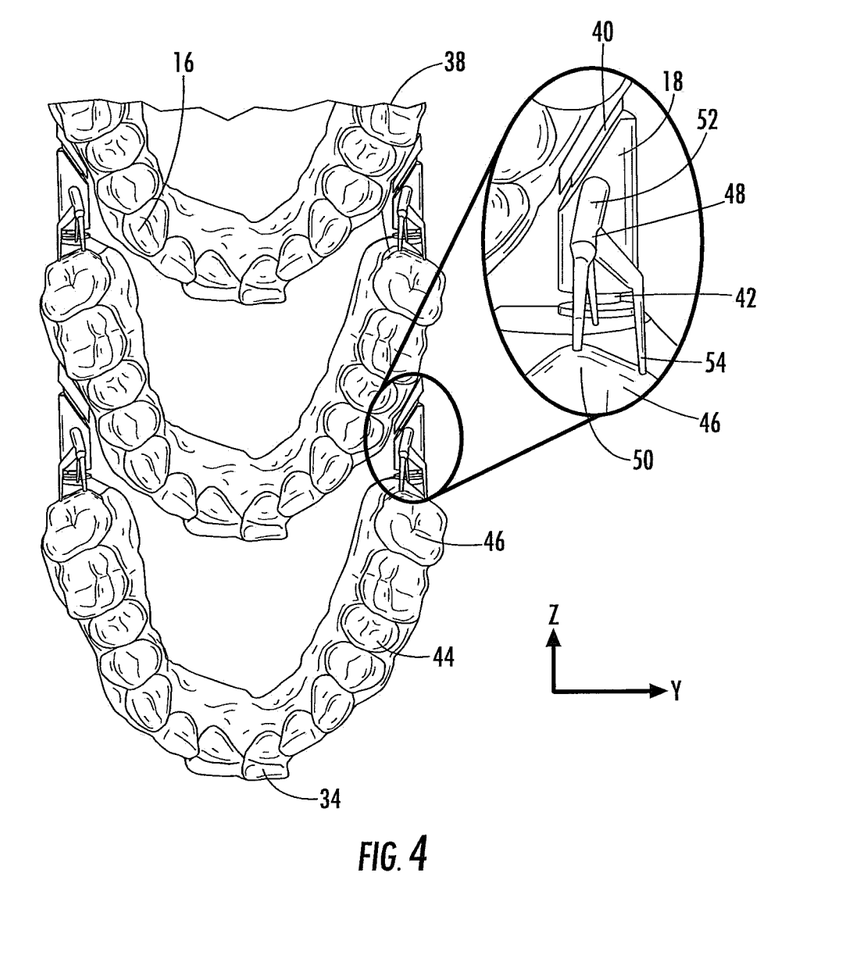
FIG. 4 is a partial front view of an embodiment of dental arches to illustrate details of support features.

FIG. 4 is a partial front view of an embodiment of dental arches 16 to illustrate details of certain support features. The couplings 18 individually include an upper slot 40 and a lower slot 42. Slots 40 and 42 provide "break-off" locations or break features for physically separating a coupling 18 from a pair of arches 16. In the illustrated embodiment, the upper slot 40 generally defines an elliptical shape that further defines an oblique angle with respect to a lateral axis Y and a vertical axis Z. The lower slot 42 generally defines a circle which is generally laterally disposed in the XY-plane.

The dental arches 16 individually hold a set of model teeth 44. In some embodiments, the teeth 44 are designed to be removable from the dental arch 16. The teeth 44 include inner molars 46 that are located proximate to the upper ends 38 of the dental arches 16. Further embodiments may omit the molars and/or may include only portions of the dental arches 16. Still further embodiments may replace the dental arches with other devices, such as the aligners for use by customers (made with biocompatible material), other dental devices, and other non-dental devices.

A branch support 48 extends from the coupling 18 to an upper and outer surface 50 of the molar 46. The branch support has a wider end 52 that connects directly to coupling 18 and a plurality of narrower tips 54 that connect directly to the upper and outer surface 50 of the molar 46.

FIGS. 1 and 2 illustrate the object 14 as including a single vertical arrangement 15 of dental arches 16. In preferred embodiments, the object 14 can include a plurality of the vertical arrangements 15 of dental arches 16.

Figure 5:
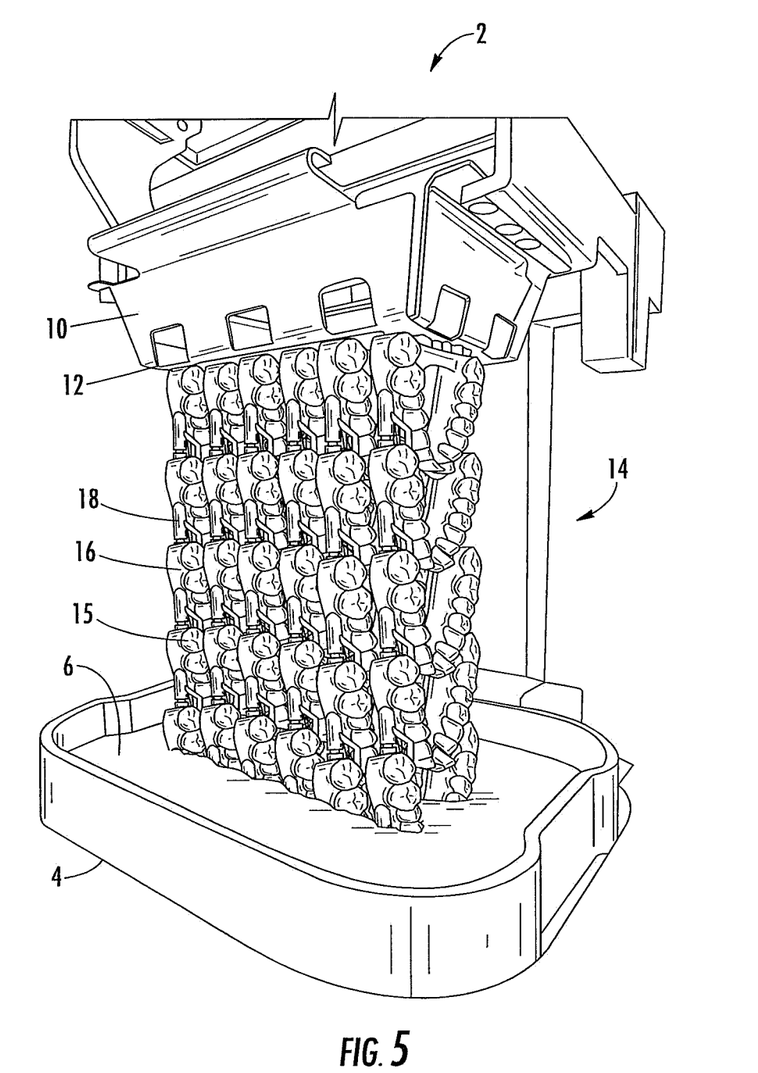
FIG. 5 is a photographic illustration of a portion of a three-dimensional printing system. The three-dimensional printing system is in a process of forming a first embodiment of an object which includes six vertical arrangements of dental arches.

FIG. 5 is an isometric drawing illustrating an embodiment of a portion of a system 2 in which object 14 includes six vertical arrangements 15 of dental arches 16. The vertical arrangements 15 individually include five dental arches 16 for a total of 30 dental arches 16 suspended from the lower face 12 of support tray 10. In the illustrated embodiment, the vertical arrangements 15 are arranged along a single axis.

Figure 6:
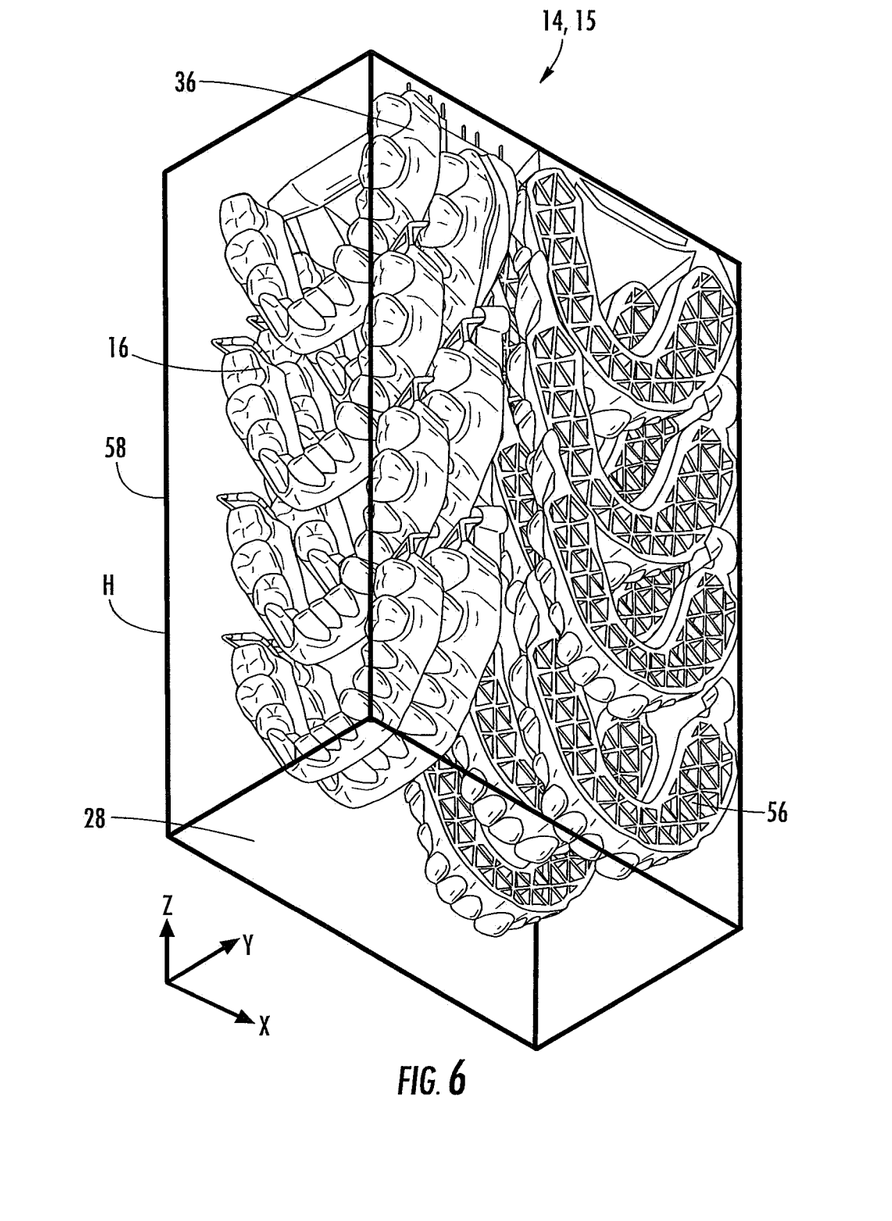
FIG. 6 is an image of a build volume containing a second embodiment of an object which includes five vertical arrangements of dental arches.
Figure 7:
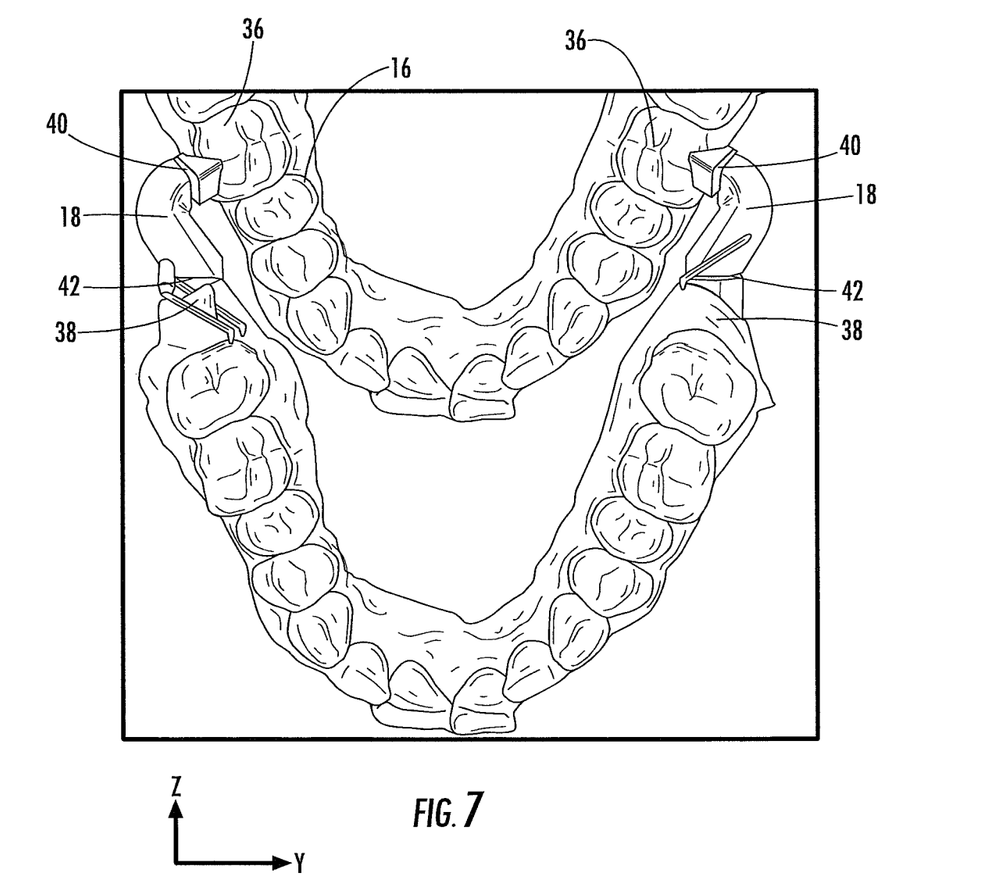
FIG. 7 is an image of a portion of the object of FIG. 6.
Figure 8:
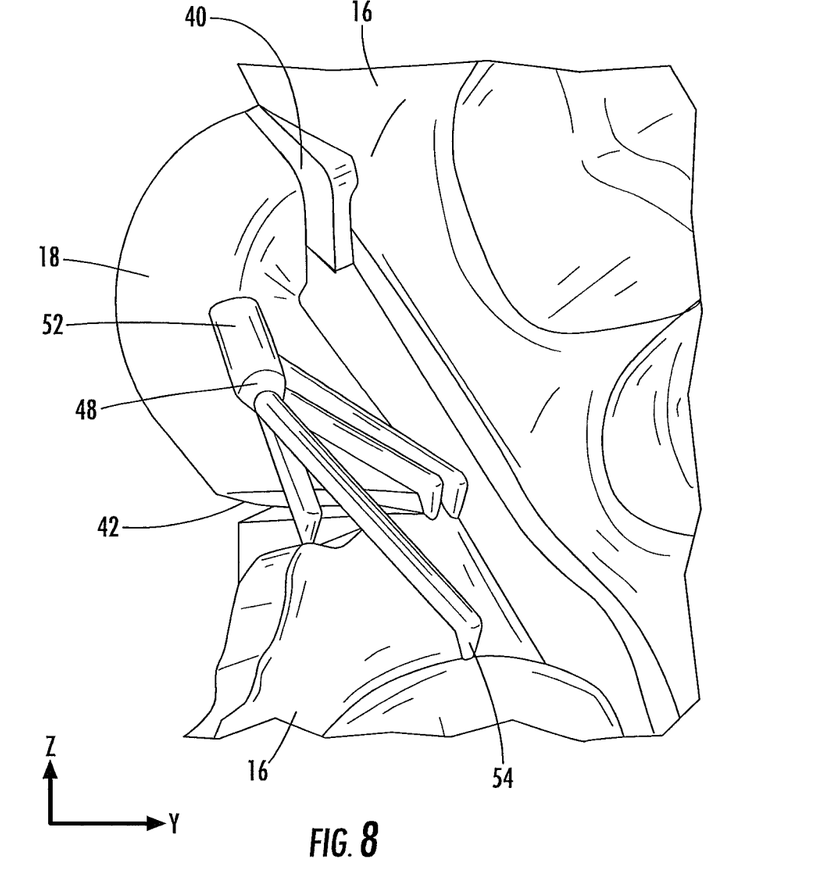
FIG. 8 is detail taken from FIG. 7.

FIGS. 6-8 are images illustrating another embodiment of an object 14 compared to what has been illustrated supra. Like element numbers indicate like elements except that there are geometrical differences in the embodiments.

FIG. 6 is an image of an embodiment of an object 14 including five vertical arrangements 15 of dental arches 16. In the illustrated embodiment, at least some of the vertical arrangements 15 individually include 4 dental arches 16. Also in the illustrated embodiment, the dental arches 16 have internal scaffolds 56 that define a triangular pattern. The use of the triangular scaffolds 56 are an alternative to the hollow design illustrated in FIGS. 1-5 and provide improved mechanical strength and a more rapid draining of uncured resin from the object 14.

The vertical arrangements 15 have a varying orientation with respect to the vertical axis Z. For two of the vertical arrangements 15, the wings 36 extend along the YZ plane. For three of the vertical arrangements 15, the wings 36 extend along the XZ plane. The varying orientation is a result of a packing algorithm. For given dental arch 16 geometries and dimensions, the algorithm maximizes a number of dental arches 16 that can be produced within a defined build volume 58 (represented by a parallelepiped box). The build volume 58 is defined by a rectangular build plane 28 and a maximum height H that the lower face 12 of a support tray 10 can rise above the build plane during fabrication of the object 14.

FIG. 7 is a more detailed image of a portion of the object 14 of FIG. 6 from the bottom of one of the vertical arrangements 15. In the illustrated embodiment, coupling 18 has a curved nonlinear shape relative to the YZ-plane and a generally triangular cross section. Coupling 18 joins an upper end 38 of a lower dental arch 16 to an outer side of a wing 36 above.

FIG. 8 is an image of a portion of FIG. 7 illustrating yet more detail of coupling 18 and branch support 48. At an upper end, the coupling 18 connects to wing 36 in a direction that is approximately normal to the wing 36. Thus, the connection between the coupling 18 and the wing 36 defines an oblique angle with respect to vertical axis Z and to a lateral direction. The coupling 18 connects to a top of the wing 36 (see FIG. 7 also).

A wider end 52 of branch support 48 is joined to the coupling 18. Branch support 48 branches toward narrower tips 54 that are joined to the lower dental arch 16. Narrower tips 54 taper downwardly toward the location at which they join the dental arch 16.

The upper slot 40 defines an oblique angle with respect to the vertical axis Z. The lower slot 42 is generally parallel with an XY plane. The upper 40 and lower 42 slots are used for separating or breaking the coupling from the dental arches 16. The generally triangular cross section of the illustrated coupling 18 along with it being perpendicular to the arch surface facilitates the breaking and separating process along the slots 40 and 42.

Figure 9A:
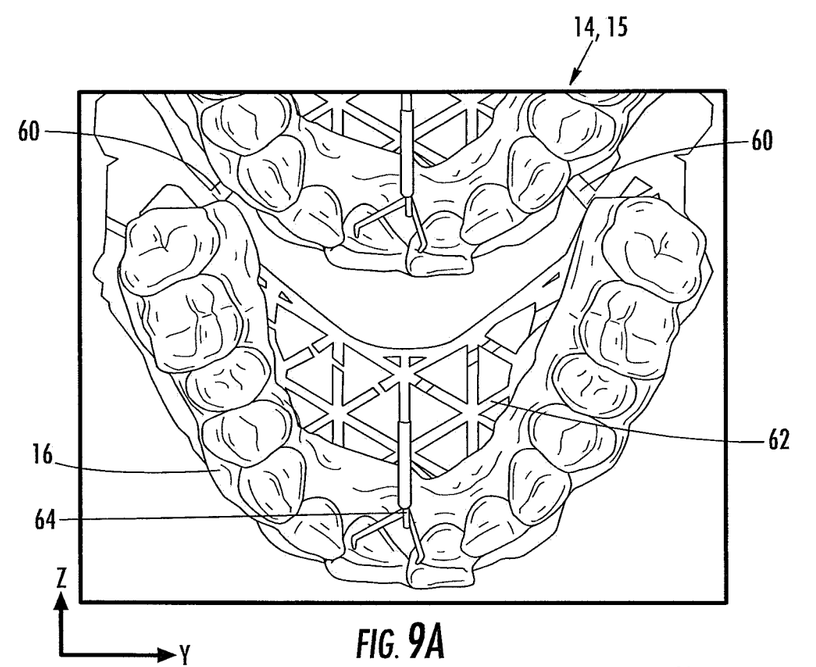
FIG. 9A is a front bottom view of an embodiment of a vertical arrangement of dental arches showing additional support details.
Figure 9B:
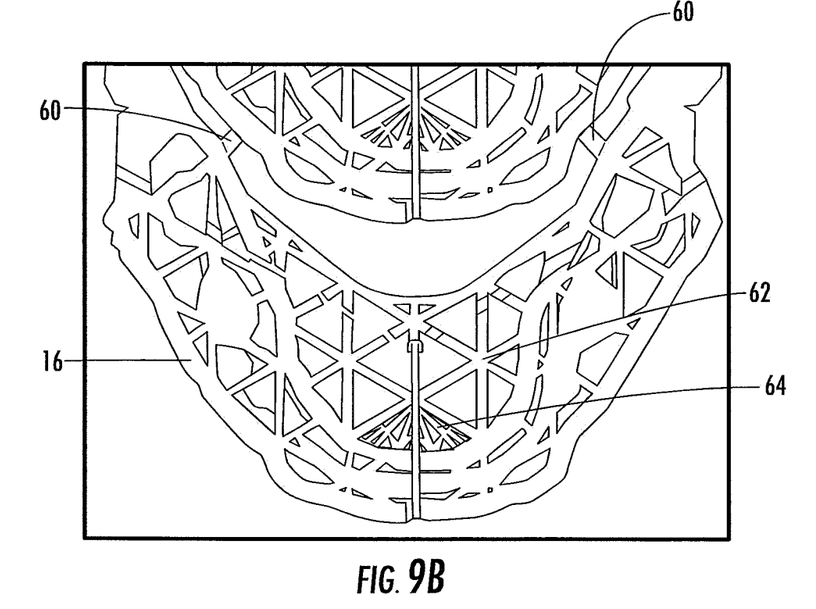
FIG. 9B is a rear bottom view of an embodiment of a vertical arrangement of dental arches showing additional support details.

FIGS. 9A-B are front (9A) and back (9B) views of a lower portion of another embodiment of a vertical arrangement 15. The embodiment of FIGS. 9A-B have some added features to further improve support and dimensional accuracy. These added features include lateral couplers 60, external scaffold 62, and added branch supports 64.

A lateral coupler 60 joins a lower and outer surface of an upper arch 16 to an upper and inner wing surface of a lower arch 16. Thus, the arch 16 is supported at opposing wing 36 locations which stiffens the vertical arrangement 15. The lateral coupler 60 can be referred to as a smaller coupler 60 with a cylindrical cross-section as oppose to the larger couplers 18 having a triangular or cylindrical cross section.

The external scaffold 62 provides vertical and lateral support for the arch 16. This improves an overall dimensional stability of arch 16. The external scaffold has a triangular geometry that defines an array of equilateral triangles to maximize a resistance to shear deformation.

The added branch supports 64 are similar in structure and function to the earlier-described branch supports 48. Branch supports 64 are supported by the external scaffold 62 and couple to front teeth of the lower arch 16. Thus a wider end of branch support 64 couples directly to the external scaffold 62. The narrower tips of branch support 64 couples to the front teeth. The wider end and narrower tips of branch support 64 are the same in structure and function to those of branch support 48.

The specific embodiments and applications thereof described above are for illustrative purposes only and do not preclude modifications and variations encompassed by the scope of the following claims.

What is claimed:

1. A three-dimensional (3-D) printing system comprising:
a resin vessel having a lower side with a transparent sheet;
a support tray having a lower face;
a motorized carriage for supporting and vertically positioning the support tray;
a light engine for projecting radiation up through the transparent sheet to a build plane; and
a controller configured to operate the motorized carriage and the light engine to form an object, the controller including a processor coupled to non-transient computer readable storage medium storing software instructions, in response to execution by the processor the software instructions form the object, the object including:
a first arrangement of at least one dental arch suspended from the lower face;
a plurality of couplings that vertically connects the first arrangement of at least one dental arch to a second arrangement of at least one dental arch.

2. The three-dimensional printing system of claim 1 wherein the object includes a plurality of the first arrangement of dental arches or a plurality of the second arrangement of dental arches.

3. The three-dimensional printing system of claim 2 wherein the first arrangement or second arrangement includes at least four dental arches.

4. The three-dimensional printing system of claim 1 wherein the first arrangement and the second arrangement include a top arch that is connected to the lower face and a plurality of additional arches below the top arch, the couplings provide a primary support for the additional arches.

5. The three-dimensional printing system of claim 1 wherein the dental arches individually include an apex and two wings, the apex is oriented convex downwardly and the wings extend generally upwardly.

6. The three-dimensional printing system of claim 5 wherein the couplings individually connect a top end of a vertical wing to an outer surface of an arch above the vertical wing.

7. The three-dimensional printing system of claim 6 wherein a dental arch is supported at two upper ends by the couplings.

8. The three-dimensional printing system of claim 1 wherein the couplings individually define a slot that provides a break feature for separating the coupling from the dental arch.

9. The three-dimensional printing system of claim 1 further comprising a branch support that extends from an outer surface of at least one of the plurality of couplings to an upper surface of a molar defined in one of the dental arches.

10. The three-dimensional printing system of claim 1 wherein the resin tray contains resin and the through the execution of software instructions by the processor the controller is further configured to:
(1) position the lower face of the support tray or the object at a build plane within the resin;
(2) operate the light engine to selectively project radiation to the build plane; and
(3) repeat (1) and (2) to complete fabrication of the object in a layer by layer manner.

11. A three-dimensional printing system comprising:
a resin vessel having a lower side with a transparent sheet;
a support tray having a lower face;
a motorized carriage for supporting and vertically positioning the support tray;
a light engine for projecting radiation up through the transparent sheet to a build plane; and
a controller including a processor coupled to a non-transient computer readable storage medium storing software instructions, in response to execution by the processor the software instructions perform the following steps:
(1) position the lower face of the support tray or the object at a build plane within the resin;
(2) operate the light engine to selectively project radiation to the build plane; and
(3) repeat (1) and (2) to complete fabrication of the object in a layer by layer manner;
wherein during steps (1)-(3) a first arrangement of at least three dental arches suspended from the lower face are formed, the at least three dental arches are pairwise vertically coupled by a vertical arrangement of couplings to a second arrangement of at least one dental arch that are formed sequentially during steps (1)-(3).

12. The three-dimensional printing system of claim 11 wherein the first arrangement of at least three dental arches includes a plurality of the first arrangement of at least three dental arches.

13. The three-dimensional printing system of claim 11 wherein the first arrangement of at least three dental arches includes a first arrangement of at least five dental arches.

14. The three-dimensional printing system of claim 11 wherein the first arrangement and the second arrangement include a top arch that is connected to the lower face and a plurality of additional arches below the top arch, the couplings provide a primary support for the additional arches.

15. The three-dimensional printing system of claim 14 wherein the plurality of dental arches individually include an apex and two wings, the apex is oriented convex downwardly and the wings extend generally upwardly.

16. The three-dimensional printing system of claim 15 wherein a dental arch is supported at two upper ends by the couplings.

17. The three-dimensional printing system of claim 11 wherein the couplings individually define a slot that provides a break feature for separating the coupling from the dental arch.

18. The three-dimensional printing system of claim 11 further comprising a branch support that extends from an outer surface of at least one of the couplings to an upper surface of a molar defined in one of the dental arches.

\* \* \* \* \*